(12) United States Patent
Yonemaru (10) Patent No.: US 10,157,641 B2
(45) Date of Patent: Dec. 18, 2018

(54) HDD HOLDING DEVICE, HDD UNIT, AND INFORMATION PROCESSING APPARATUS

(71) Applicant: NEC Platforms, Ltd., Kawasaki-shi, Kanagawa (JP)

(72) Inventor: Shinichirou Yonemaru, Kanagawa (JP)

(73) Assignee: NEC Platforms, Ltd., Kawasaki-shi, Kanagawa (JP)

(*) Notice: Subject to any disclaimer, the term of this patent is extended or adjusted under 35 U.S.C. 154(b) by 0 days.

(21) Appl. No.: 15/565,988

(22) PCT Filed: Feb. 3, 2016

(86) PCT No.: PCT/JP2016/000552
§ 371 (c)(1),
(2) Date: Oct. 12, 2017

(87) PCT Pub. No.: WO2016/170714
PCT Pub. Date: Oct. 27, 2016

(65) Prior Publication Data
US 2018/0114548 A1 Apr. 26, 2018

(30) Foreign Application Priority Data

Apr. 24, 2015 (JP) ................. 2015-089151

(51) Int. Cl.
*H05K 7/00* (2006.01)
*H05K 5/00* (2006.01)
(Continued)

(52) U.S. Cl.
CPC .............. *G11B 33/08* (2013.01); *F16F 7/00* (2013.01); *G06F 1/1601* (2013.01); *G06F 1/187* (2013.01); *G11B 33/124* (2013.01); *F16F 1/3732* (2013.01)

(58) Field of Classification Search
CPC ........................................... G06F 1/18
(Continued)

(56) References Cited

U.S. PATENT DOCUMENTS 5,067,041 A * 11/1991 Cooke ............... G06F 1/182
361/679.4
5,943,208 A * 8/1999 Kato ............... G06F 1/184
248/222.11
(Continued)

FOREIGN PATENT DOCUMENTS

CN 202150156 U 2/2012
CN 202584303 U 12/2012
(Continued)

OTHER PUBLICATIONS

Office Action for JP 2016-172563 dated Dec. 14, 2016.
(Continued)

Primary Examiner — Jerry Wu
(74) Attorney, Agent, or Firm — Sughrue Mion, PLLC (57) ABSTRACT

An HDD holding device includes a base portion, a plurality of buffer members, and an HDD mounting portion to which an HDD is mounted. The plurality of buffer members include a buffer member being a first buffer member interposed between the base portion and the HDD mounting portion so that a mounting axis direction of the first buffer member is set along a Y direction selected among a width direction, a depth direction and, a height direction of the base portion, and include a buffer member being a second buffer member interposed between the base portion and the HDD mounting portion so that a mounting axis direction of the second buffer member is set along the Z direction.

19 Claims, 11 Drawing Sheets

(51) Int. Cl.
   *G11B 33/08* (2006.01)
   *F16F 7/00* (2006.01)
   *G06F 1/16* (2006.01)
   *G11B 33/12* (2006.01)
   *G06F 1/18* (2006.01)
   *F16F 1/373* (2006.01)

(58) Field of Classification Search
   USPC .................................................. 361/679.01
   See application file for complete search history.

(56) References Cited

U.S. PATENT DOCUMENTS

| | | |
|---|---|---|
| 6,498,722 B1 | 12/2002 | Stolz et al. |
| 6,697,250 B2 | 2/2004 | Kuo |
| 2006/0067043 A1 | 3/2006 | Kotani et al. |
| 2006/0245156 A1 | 11/2006 | Sun |
| 2007/0025014 A1 | 2/2007 | Kim |
| 2007/0297129 A1 | 12/2007 | Liu et al. |
| 2008/0007865 A1 | 1/2008 | Orriss et al. |
| 2013/0015317 A1 | 1/2013 | Huang et al. |
| 2014/0085803 A1* | 3/2014 | Sun .......................... G06F 1/187 361/679.33 |

FOREIGN PATENT DOCUMENTS

| | | |
|---|---|---|
| EP | 2 134 148 A1 | 12/2009 |
| JP | 62-090497 U1 | 6/1987 |
| JP | 62-124688 U | 8/1987 |
| JP | 10-208462 A | 8/1998 |
| JP | 2006-092703 A | 4/2006 |
| JP | 2008-535129 A | 8/2008 |
| JP | 2010-073262 A | 4/2010 |
| JP | 2012-104198 A | 5/2012 |
| TW | M366695 U1 | 10/2009 |
| WO | 03/017278 A1 | 2/2003 |

OTHER PUBLICATIONS

Notice of Rejection for JP 2015-089151 dated Jun. 8, 2016.
International Search Report for PCT/JP2016/000552 dated Apr. 26, 2016.

* cited by examiner

HDD HOLDING DEVICE, HDD UNIT, AND INFORMATION PROCESSING APPARATUS

CROSS REFERENCE TO RELATED APPLICATIONS

This application is a National Stage of International Application No. PCT/JP2016/000552 filed Feb. 3, 2016, claiming priority based on Japanese Patent Application No. 2015-089151 filed Apr. 24, 2015, the contents of all of which are incorporated herein by reference in their entirety.

TECHNICAL FIELD

This invention relates to a hard disk drive (HDD) holding device configured to hold an HDD, an HDD unit including the HDD holding device and the HDD, and an information processing apparatus including the HDD unit.

BACKGROUND ART

When a hard disk drive (HDD) is installed in an information processing apparatus such as a point of sales (POS) terminal apparatus, in order to, for example, facilitate mounting and removing work, an HDD holding device configured to hold the HDD is sometimes used. The HDD holding device and the HDD held by the HDD holding device are combined together to construct an HDD unit. The HDD unit is removably installed in the information processing apparatus.

Incidentally, the HDD may malfunction or fail by receiving vibration and shock (hereinafter simply referred to as shock). Accordingly, in general, shock absorbing action is imparted to the HDD.

In order to further increase a shock absorbing effect, there has been proposed or practically used a technology of imparting the shock absorbing action to the HDD holding device in addition to imparting the shock absorbing action to the drive itself.

The HDD holding device having the shock absorbing action is disclosed in, for example, Patent Document 1. The HDD holding device disclosed in Patent Document 1 includes a reinforcing member to which the HDD is mounted, and includes a support member configured to support, through intermediation of four buffer members, the reinforcing member to which the HDD is mounted. Each of the four buffer members is arranged so that a mounting axis direction thereof is set along a height direction of the HDD holding device.

PRIOR ART DOCUMENTS

Patent Document

Patent Document 1: JP-A-2006-092703

SUMMARY OF THE INVENTION

Problem to be Solved by the Invention

Incidentally, some information processing apparatus such as a POS terminal apparatus includes a support base unit, and a display unit mounted to the support base unit so as to be tiltable. When the HDD unit is installed in such a tiltable display unit of the information processing apparatus, the HDD unit is also postured at various angles in the display unit as a result of tilting of the display unit.

Meanwhile, the buffer members of the HDD holding device each have the shock absorbing action exerted in only one of three axis directions, or have the shock absorbing action exerted in a plurality of directions. However, a buffer member, which has the shock absorbing action exerted in the plurality of directions, does not exert the shock absorbing action in the plurality of directions at the same level, but exerts the shock absorbing action in a fixed direction at the highest level. For example, it is conceivable that each of the four buffer members of the HDD holding device disclosed in Patent Document 1 has the shock absorbing action exerted only in the mounting axis direction, or has the shock absorbing action exerted in the mounting axis direction at the highest level.

When this is taken into consideration, as a result of tilting of the display unit, the HDD unit, which is installed in the tiltable display unit of the information processing apparatus, is sometimes used in an inclined state of being incapable of exerting satisfactory shock absorbing effect.

In addition, when a user tilts the display unit of the information processing apparatus, that is, when a tilt angle of the display unit is varied or when the display unit is tilted to a maximum angle to reach a rearward tilting end or a forward tilting end, shock may easily occur. The above-mentioned matter that the HDD unit cannot exert satisfactory shock absorbing effect is not preferred.

Therefore, it is an object of this invention to provide an HDD holding device capable of exerting satisfactory shock absorbing action even when the HDD holding device is used at any angle or used under a condition that an angle is varied.

It is another object of this invention to provide an HDD unit including the above-mentioned HDD holding device and an HDD It is further another object of this invention to provide an information processing apparatus including the above-mentioned HDD unit.

Means to Solve the Problem

According to one aspect of this invention, there is provided an HDD holding device comprising a base portion, a plurality of buffer members each having a mounting axis direction, and an HDD mounting portion, which is configured to mount an HDD thereon, and is supported by the base portion through intermediation of the plurality of buffer members, the plurality of buffer members comprising a first buffer member interposed between the base portion and the HDD mounting portion so that the mounting axis direction is set along a first direction selected among the first direction, a second direction, and a third direction that each correspond to any one of a width direction, a depth direction, and a height direction of the base portion, and a second buffer member interposed between the base portion and the HDD mounting portion so that the mounting axis direction is set along the second direction.

According to another aspect of this invention, there is provided an HDD unit comprising the HDD holding device and the HDD held by the HDD holding device.

According to still another aspect of this invention, there is provided an information processing apparatus comprising the HDD unit, and an information processing unit configured to process information.

Effect of the Invention

According to this invention, there can be obtained the HDD holding device capable of exerting the satisfactory shock absorbing action even when the HDD holding device is used at any angle or used under the condition that the angle is varied.

BRIEF DESCRIPTION OF THE DRAWING

FIG. 1 includes views for illustrating an HDD holding device according to one embodiment of this invention, in which FIG. 1(a) is a perspective view, and FIG. 1(b) is an exploded perspective view.

FIG. 2 includes views for illustrating components of the HDD holding device of FIG. 1, in which FIG. 2(a) is a perspective view for illustrating a base portion and an HDD mounting portion, and FIG. 2(b) is a perspective view for illustrating one of buffer members and a mounting screw.

FIG. 3 includes views for illustrating the HDD holding device of FIG. 1 cut into some shapes, in which FIG. 3(a) is a perspective view for illustrating the HDD holding device cut along a cutting-plane line passing through one of two first buffer members. FIG. 3(b) is a portional view for illustrating the vicinity of the one of the first buffer members of FIG. 3(a), FIG. 3(c) is a perspective view for illustrating the HDD holding device cut along a cutting-plane line passing through another one of the two first buffer members, and FIG. 3(d) is a portional view for illustrating the vicinity of the another one of the first buffer members of FIG. 3(c).

FIG. 4 includes views for illustrating the HDD holding device of FIG. 1 cut into some shape, in which FIG. 4(a) is a perspective view for illustrating the HDD holding device cut along a cutting-plane line passing through the two first buffer members, and FIG. 4(b) is a portional view for illustrating the vicinities of the two first buffer members of FIG. 4(a).

FIG. 5 includes views for illustrating the HDD holding device of FIG. 1 cut into some shapes, in which FIG. 5(a) is a perspective view for illustrating the HDD holding device cut along a cutting-plane line passing through a second buffer member, FIG. 5(b) is a portional view for illustrating the vicinity of the second buffer member of FIG. 5(a), FIG. 5(c) is a perspective view for illustrating the HDD holding device cut along another cutting-plane line passing through the second buffer member, and FIG. 5(d) is a portional view for illustrating the vicinity of the second buffer member of FIG. 5(c).

FIG. 7 includes views for illustrating an HDD unit according to the embodiment of this invention, in which FIG. 7(a) is a perspective view seen from an upper side of the HDD unit, and FIG. 7(b) is a perspective view seen from a lower side of the HDD unit.

FIG. 8 includes views for illustrating the HDD unit of FIG. 7, in which FIG. 8(a) is a plan view seen from the upper side of the HDD unit, FIG. 8(b) is a front view, and FIG. 8(c) is a right side view.

FIG. 9 includes views for illustrating a POS terminal apparatus according to the embodiment of this invention being an information processing apparatus, in which FIG. 9(a) is a perspective view, and FIG. 9(b) is a right side view.

FIG. 10 includes views for illustrating an interior of a display unit of the POS terminal apparatus of FIG. 9, in which FIG. 10(a) is a perspective view for illustrating the display unit from which a top cover and a rear cover are removed, and FIG. 10(b) is a portional view for partially illustrating the interior of the display unit.

FIG. 11 includes views for illustrating a corresponding relationship between a tilted state of the display unit of the POS terminal apparatus of FIG. 9, and an inclined state of the HDD unit (or the HDD holding device) built in the display unit, in which FIG. 11(a) is a right side view for illustrating the POS terminal apparatus including the display unit in an upright state, FIG. 11(b) is a right side view for illustrating the HDD unit (or the HDD holding device) built in the display unit in the upright state, FIG. 11(c) is a right side view for illustrating the POS terminal apparatus including the display unit in the tilted state of being tilted to a deep side along a depth direction D, and FIG. 11(d) is a right side view for illustrating the HDD unit (or the HDD holding device) built in the display unit in the tilted state.

MODES FOR EMBODYING THE INVENTION

An HDD holding device according to this invention includes a base portion, a plurality of buffer members, and an HDD mounting portion.

The plurality of buffer members each have a mounting axis direction. A hard disk drive (HDD) is mounted to the HDD mounting portion, and the HDD mounting portion is supported by a base portion through intermediation of the plurality of buffer members.

The plurality of buffer members further include a first buffer member and a second buffer member.

The first buffer member is interposed between the base portion and the HDD mounting portion so that a mounting axis direction of the first buffer member is set along a first direction selected among the first direction, a second direction, and a third direction that each correspond to any one of a width direction, a depth direction, and a height direction of the base portion. The second buffer member is interposed between the base portion and the HDD mounting portion so that a mounting axis direction of the second buffer member is set along the second direction.

With the above-mentioned configuration, the HDD holding device is capable of exerting satisfactory shock absorbing action even when the HDD holding device is used at any angle or used under a condition that an angle is varied.

That is, in the HDD holding device according to this invention, each of the buffer members has the shock absorbing action exerted in only one of three axis directions, or has the shock absorbing action exerted in a plurality of directions. However, even when each of the buffer members exerts the shock absorbing action in a fixed direction at the highest level, the HDD holding device includes the buffer members that exert the shock absorbing action in at least two directions at the highest level. Accordingly, when the HDD holding device according to this invention is installed in a tillable region of an information processing apparatus as a component of an HDD unit, the HDD holding device can exert the sufficient shock absorbing action even when used at various angles as a result of tilting of the tiltable region, or used under a condition that an angle is varied.

Now, with reference to the drawings, an HDD holding device according to a more specific embodiment of this invention is described.

[HDD Holding Device]

With reference to FIG. 1(a), FIG. 1(b), FIG. 2(a), and FIG. 2(b), an HDD holding device 10 according to the embodiment of this invention includes a base portion 11 obtaining by performing sheet metal working on, for example, a galvanized steel plate, a plurality of elastically deformable buffer members 13z and 13y made of, for example, butyl rubber, and an HDD mounting portion 12 obtained by performing sheet metal working on, for example, a galvanized steel plate.

Figure 1:
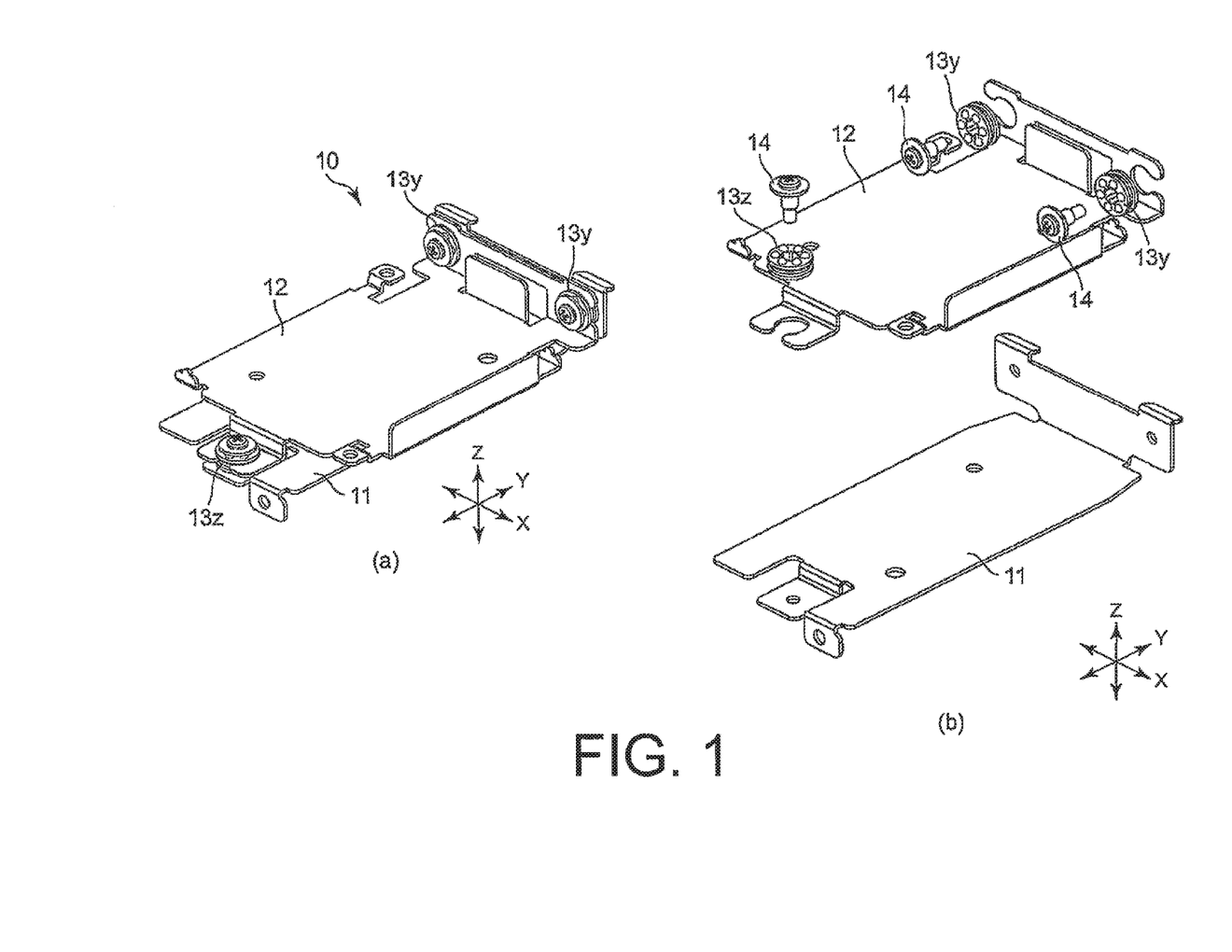
Figure 2:
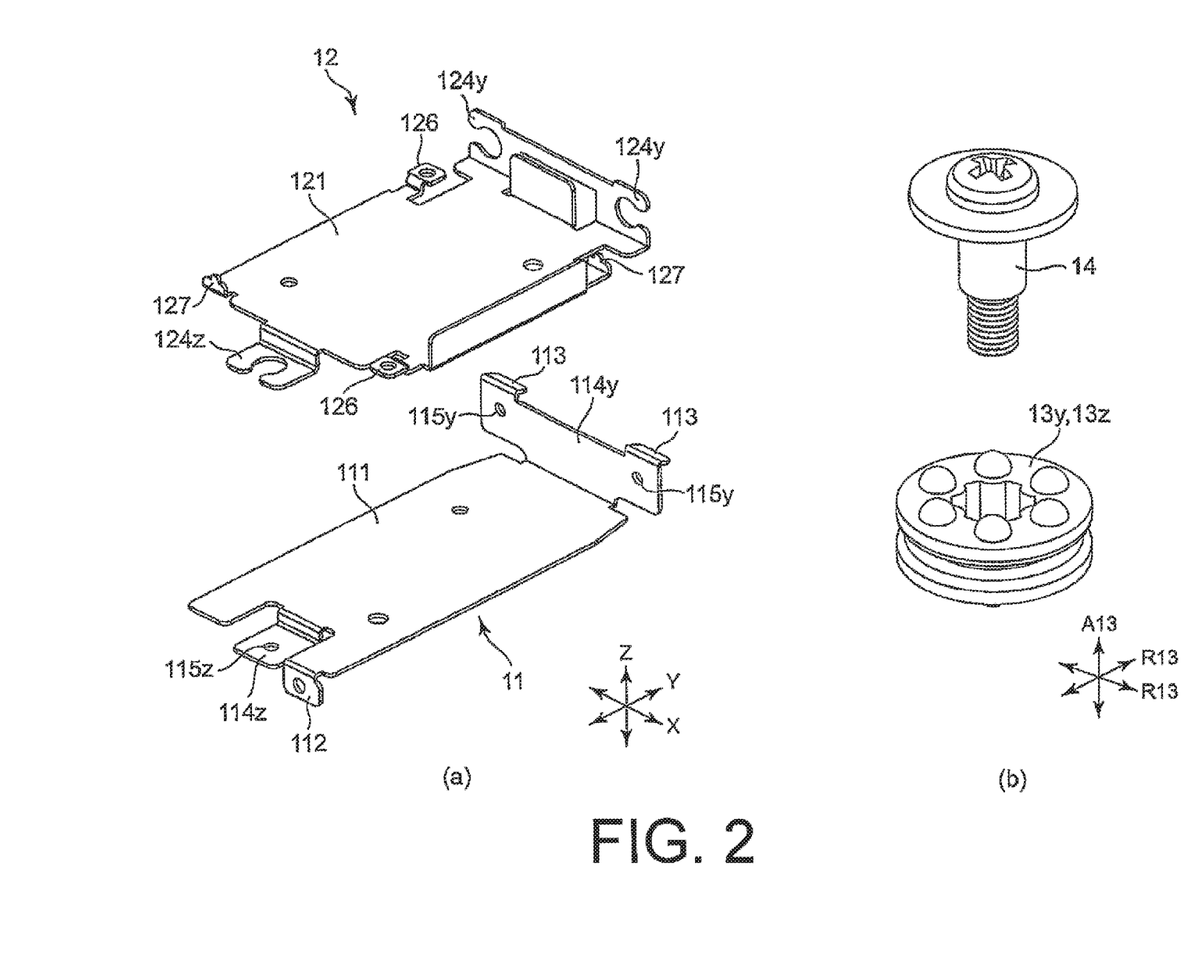

As illustrated in FIG. 2(b), each of the plurality of buffer members 13z and 13y has a substantially tubular shape, and has a mounting axis direction A13 being an axis direction of the tubular shape.

A hard disk drive (HDD) to be described later is mounted to the HDD mounting portion 12, and the HDD mounting portion 12 is supported by the base portion 11 through intermediation of the plurality of buffer members 13z and 13y.

As illustrated in FIG. 2(a), the base portion 11 includes a main surface 111, a through-hole portion 112 to be described later, two insertion guide portions 113, a seat portion 114y, two screw hole portions 11.5y, a seat portion 114z, and a screw hole portion 115z, The insertion guide portions 113 are configured to easily insert the HDD unit into an HDD housing portion (not shown) formed in a frame of a display unit 620.

As illustrated in FIG. 2(a), the HDD mounting portion 12 includes a main surface 121, two cutout portions 124y, a cutout portion 124z, two through-hole portions 126 to be described later, and two positioning protrusions 127 to be described later.

The plurality of buffer members further include a first buffer member (buffer member 13y), and a second buffer member (buffer member 13z).

Each of the first buffer members 13y is interposed between the base portion 11 and the HDD mounting portion 12 so that the mounting axis direction A13 (FIG. 2(b)) of each of the first buffer members 13y is set along a first direction (Y direction) selected among the first direction (Y direction), a second direction (Z direction and a third direction (X direction) that each correspond to any one of a width direction (X direction), a depth direction (Y direction), and a height direction (Z direction) of the base portion 11.

Further, the second buffer member 13z is interposed between the base portion 11 and the HDD mounting portion 12 so that the mounting axis direction of the second buffer member 13z is set along the second direction (Z direction).

Also with reference to FIG. 3(a) to FIG. 3(d), FIG. 4(a), FIG. 4(b), and FIG. 5(a) to FIG. 5(d), each of the buffer members 13z and 13y has a substantially tubular shape, and has shock absorbing action exerted in both the mounting axis direction A13 and a radial direction R13 orthogonal to the mounting axis direction A13 (in the drawings, only two axis directions indicating the radial direction are illustrated). However, each of the buffer members 13z and 13y has the shock absorbing action exerted in the mounting axis direction A13 at the highest level.

Under a state in which the buffer member 13z can exert the shock absorbing action, the buffer member 13z is inserted into the cutout portion 124z formed in the HDD mounting portion 12. In addition, under a state in which the buffer member 13z inserted into the cutout portion 124z of the HDD mounting portion 12 can exert the shock absorbing action, the buffer member 13z is fastened with a flanged screw 14 to the screw hole portion 115z formed in the seat portion 114z formed on the base portion 11.

Under a state in which the two buffer members 13y can exert the shock absorbing action, the two buffer members 13y are respectively inserted into the cutout portions 124y formed in the HDD mounting portion 12. In addition, under a state in which the buffer members 13y inserted into the cutout portions 124y of the HDD mounting portion 12 can exert the shock absorbing action, the buffer members 13y are fastened with the flanged screws 14 to the screw hole portions 115y formed in the seat portion 114y formed on the base portion 11.

In this embodiment, there is not provided a buffer member having a mounting axis direction along the width direction (X direction) of the base portion 11. It is assumed that the HDD holding device 10 receives less shock in the width direction (X direction) of the base portion 11 than in the depth direction (Y direction) of the base portion 11 and the height direction (Z direction) of the base portion 11 when the HDD holding device 10 is used to be installed in a POS terminal apparatus to be described later.

However, it is not always said that the HDD holding device 10 according to this embodiment does not absorb vibration generated in the width direction (X direction) of the base portion 11.

That is, the shock in the depth direction (Y direction) of the base portion 11 is absorbed by the shock absorbing action exerted in the mounting axis direction A13 of each of the two buffer members 13y, and by the shock absorbing action exerted in the radial direction R13 of the buffer member 13z. In this embodiment, the shock absorbing action exerted in the depth direction (Y direction) of the base portion 11 has the highest level. The reason is as follows. When an HDD 60, which is described later and an object to be held by the HDD holding device 10, is installed in a POS terminal apparatus to be described later, the Y direction is set vertically when the HDD holding device 10 assumes a basic posture, and it is conceivable that the shock due to a self-weight of the HDD 60 is largest when the HDD holding device 10 assumes the basic posture.

Further, the shock in the height direction (Z direction) of the base portion 11 is absorbed by the shock absorbing action exerted in the mounting axis direction A13 of the buffer member 13z, and by the shock absorbing action exerted in the radial direction R13 of each of the two buffer members 13y. in this embodiment, the shock absorbing action exerted in the height direction (Z direction) of the base portion 11 has the second highest level next to the shock absorbing action exerted in the depth direction (Y direction) of the base portion 11.

In addition, the shock in the width direction (X direction) of the base portion 11 is absorbed by the shock absorbing action exerted in the radial direction R13 of the buffer member 13z, and by the shock absorbing action exerted in the radial direction R13 of each of the two buffer members 13y.

In the HDD holding device according to this invention, the plurality of buffer members may further include a third buffer member, which is interposed between the base portion and the HDD mounting portion so that a mounting axis direction of the third buffer member is set along the third direction (X direction) selected among the second direction (Z direction), the first direction (Y direction), and the third direction (X direction) that each correspond to any one of the width direction (X direction), the depth direction (Y direction), and the height direction (Z direction) of the base portion 11. In this case, the number of at least one of the first buffer member, the second buffer member, and the third buffer member may be two, or there or more.

[HDD Unit]

Also with reference to FIG. 6, FIG. 7(a), FIG. 7(b), and FIG. 8(a) to FIG. 8(c), the HDD 60 is, for example, a hard disk drive of a 2.5-inch type. A pair of right and left side surfaces of the HDD 60, and a bottom surface of the HDD 60 each have four screw hole portions for fixation. In this embodiment, the screw hole portions in the bottom surface of the HDD 60 are used.

As illustrated in FIG. 2(a), the HDD mounting portion 12 of the HDD holding device 10 includes the two through-hole portions 126 and the two positioning protrusions 127. Further, the positioning protrusions 127 are inserted into, among the four screw hole portions in the bottom surface of the HDD 60, two screw hole portions on a first diagonal line, respectively, and screws 65 are threadingly engaged through the through-hole portions 126 into the remaining two screw hole portions on a second diagonal line, respectively. In this manner, the HDD 60 is fixed to the HDD mounting portion 12 of the HDD holding device 10. Further, the HDD holding device 10, and the HDD 60 mounted to the HDD mounting portion 12 of the HDD holding device 10 construct an HDD unit 70.

In this embodiment, one buffer member 13z having the mounting axis direction along the Z direction is arranged on a connector side of the HDD 60, whereas the two buffer members 13y each having the mounting axis direction along the Y direction are arranged on a side of the HDD 60 opposite to the connector side. However, two buffer members each having the mounting axis direction along the Y direction may be arranged on the connector side of the HDD, whereas one buffer member having the mounting axis direction along the Z direction may be arranged on the side of the HDD opposite to the connector side. In this case, in order to lead out a cable to be connected to the connector of the HDD, a space is secured between the two buffer members each having the mounting axis direction along the Y direction. In this embodiment, as the space, a cutout portion of the seat portion 114y (FIG. 2(a)) or the like between the two buffer members may be used.

[POS Terminal Apparatus]

Also with reference to FIG. 9(a), FIG. 9(b), FIG. 10(a), FIG. 10(b), and FIG. 11(a) to FIG. 11(d), the HDD unit 70 according to this embodiment is installed in a POS terminal apparatus 600 being an information processing apparatus.

The POS terminal apparatus 600 includes a main body 610 serving as a support base unit, and the display unit 620 mounted to the main body 610 through a tilt hinge unit 630. The display unit 620 includes a rear cover 626 and a top cover 627 that are removably mounted to the display unit 620.

Figure 11:
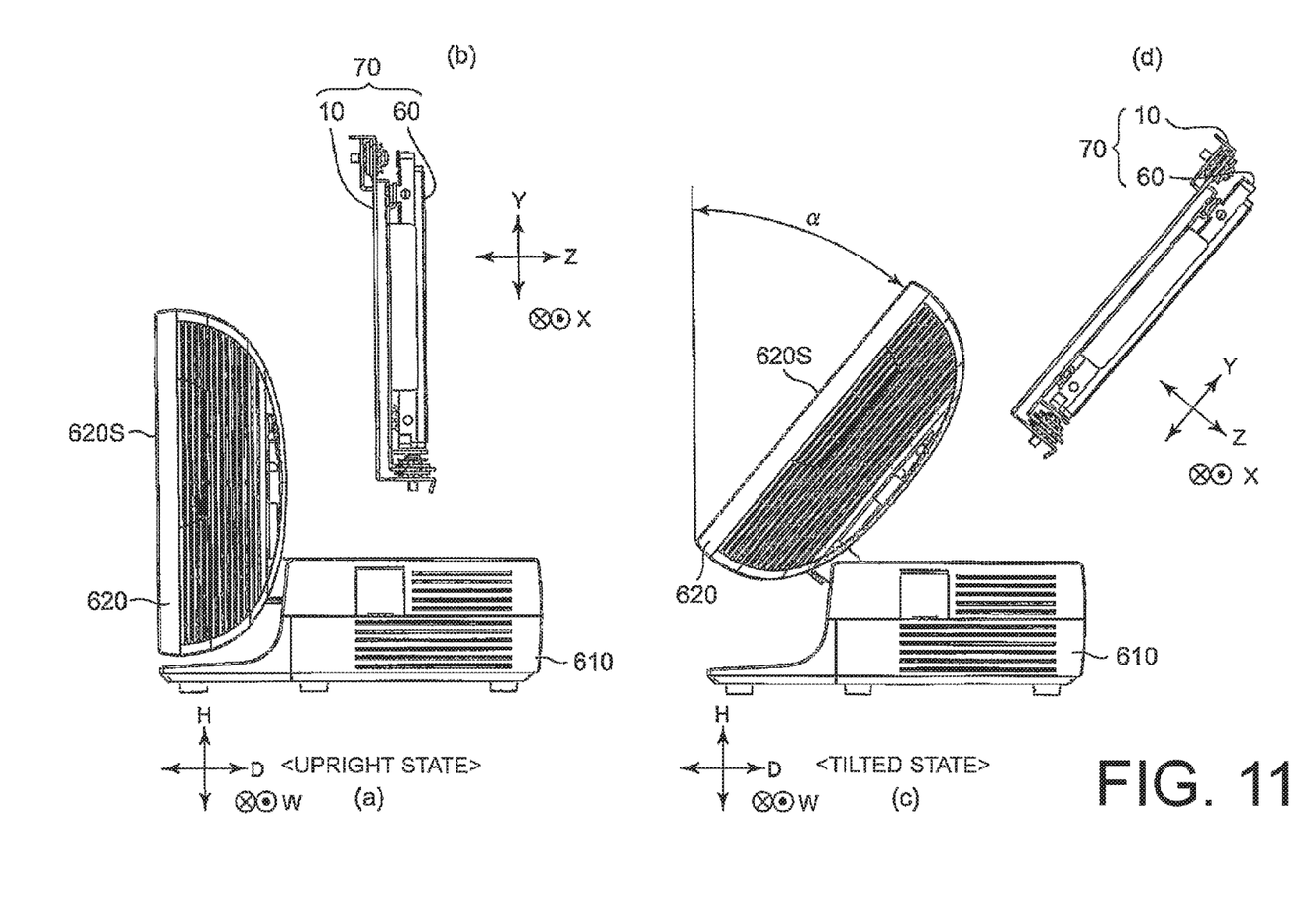

As illustrated in FIG. 11(a) and FIG. 11(c), the display unit 620 is tiltable within a range of a tilt angle α along a depth direction D of the main body 610 from an upright state in which a display screen 620S of the display unit 620 is arranged along a height direction H of the main body 610. In this embodiment, the angle α is about 40 degrees. The display unit 620 is tiltable only to a rear side of the main body 610 along the depth direction D so that the display screen 620S is turned upward. However, the display unit 620 may also be tiltable to a front side of the main body 610 along the depth direction D so that the display screen 620S is turned downward.

The POS terminal apparatus 600 includes a power supply unit (not shown), a control unit configured to control general operation of the POS terminal apparatus 600, and a touch panel display obtained by layering a touch panel on a liquid crystal display or the like. The control unit includes a computing element, and also functions as an information processing unit configured to perform processing regarding checkout of merchandise to be purchased by a. customer.

Figure 10:
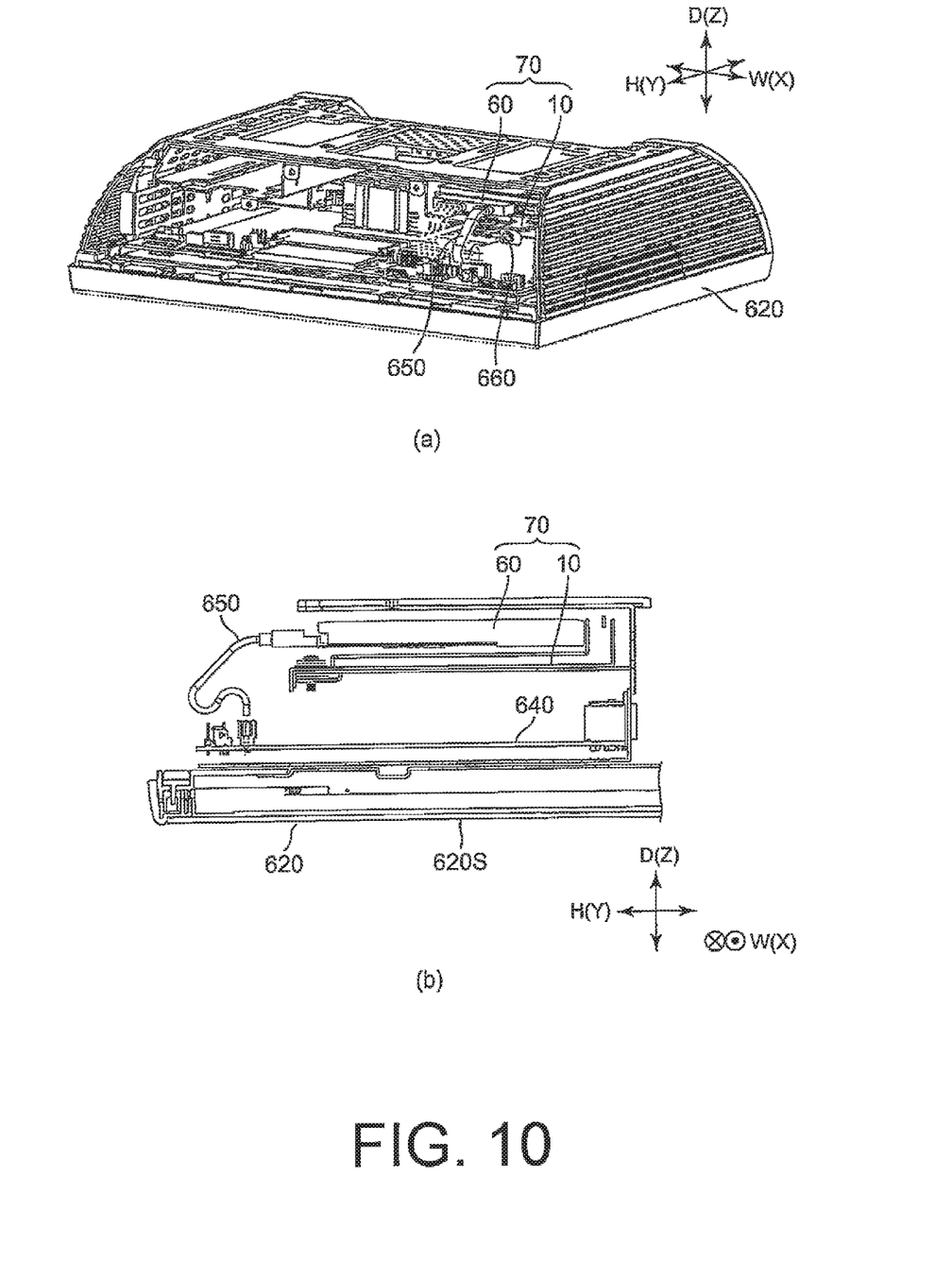

The power supply unit is built in the main body 610. The touch panel display is built in the display unit 620. In the drawings, reference symbol 620S denotes a display screen of the touch panel display. As illustrated in FIG. 10(a) and FIG. 10(b), as a control circuit board 640, the control unit is removably built in the display unit 620. In FIG. 10(a) and FIG. 10(b), illustration of a part of on-board components of the control circuit board 640 is omitted. The control circuit board 640 is electrically connected to the power supply unit and the display unit with a touch panel. As described later, the control circuit board 640 is further electrically connected to the HDD 60 of the HDD unit 70.

When the display unit 620 is in the upright state as illustrated in FIG. 11(a), the HDD unit 70 is built in the display unit 620 so that the first direction (Y direction) of the HDD holding device 10 is set along the height direction H of the main body 610 being the support base unit, and that the second direction (Z direction) of the HDD holding device 10 is set along the depth direction D of the main body 610 as illustrated in FIG. 11(b).

Figure 3:
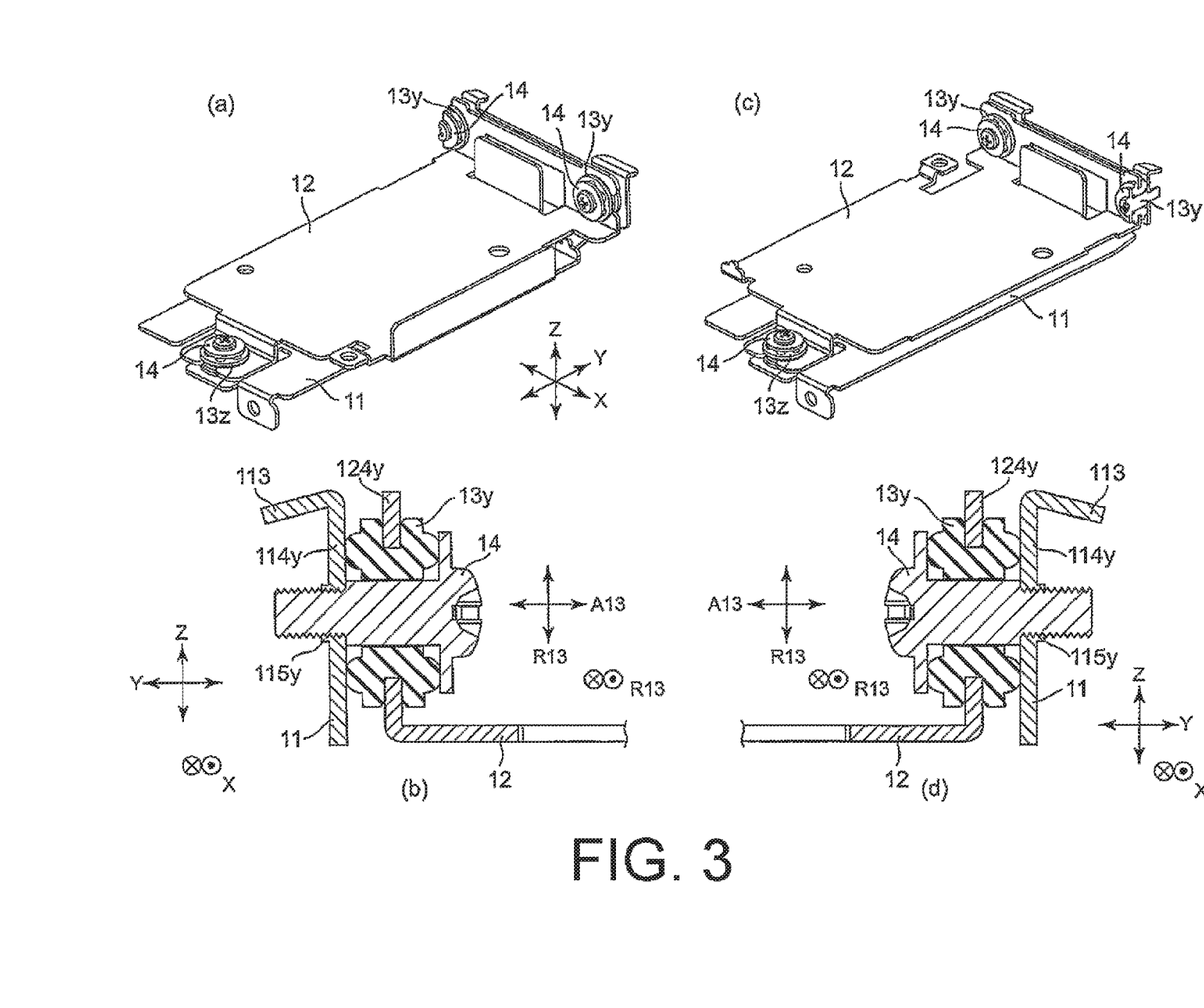
Figure 4:
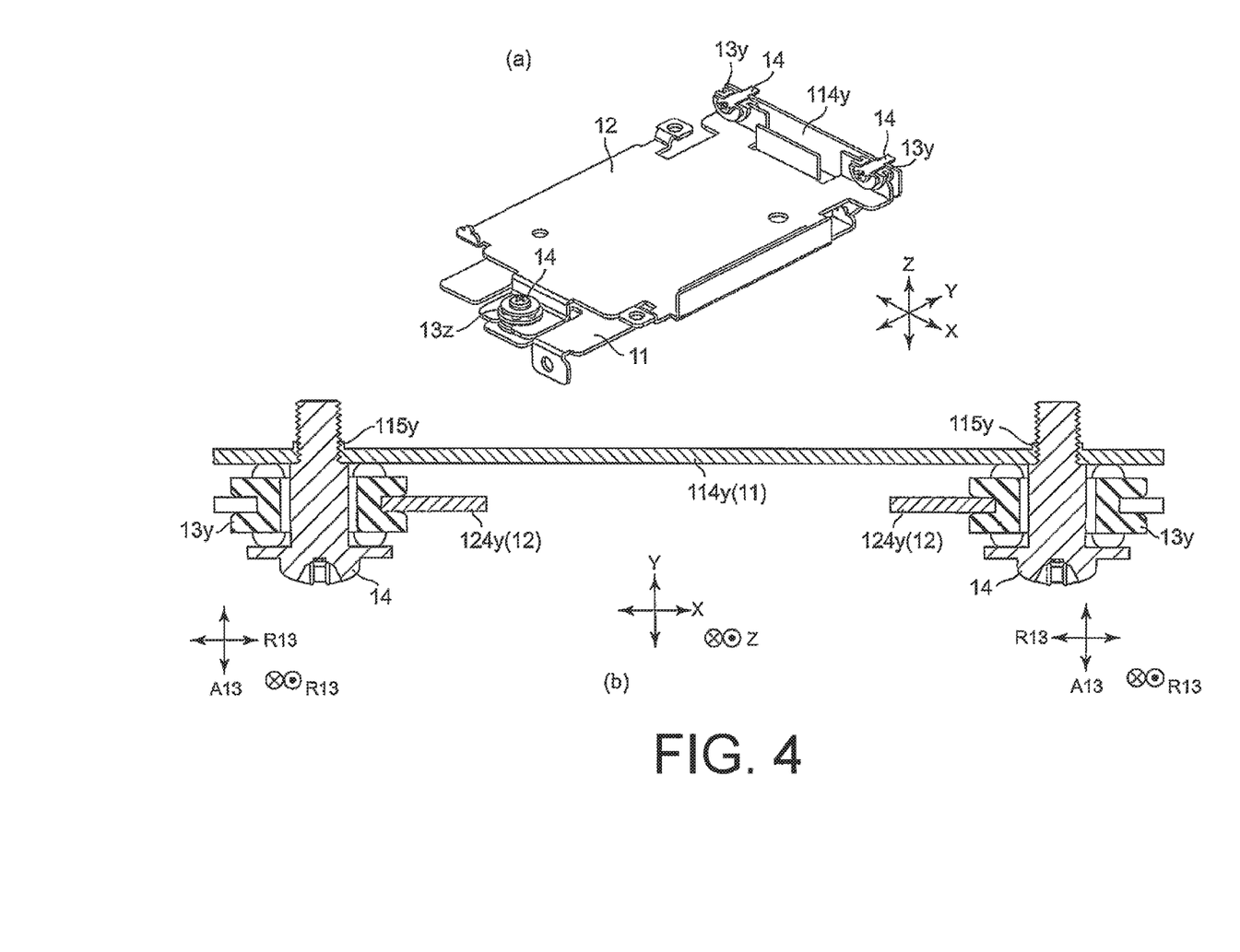
Figure 5:
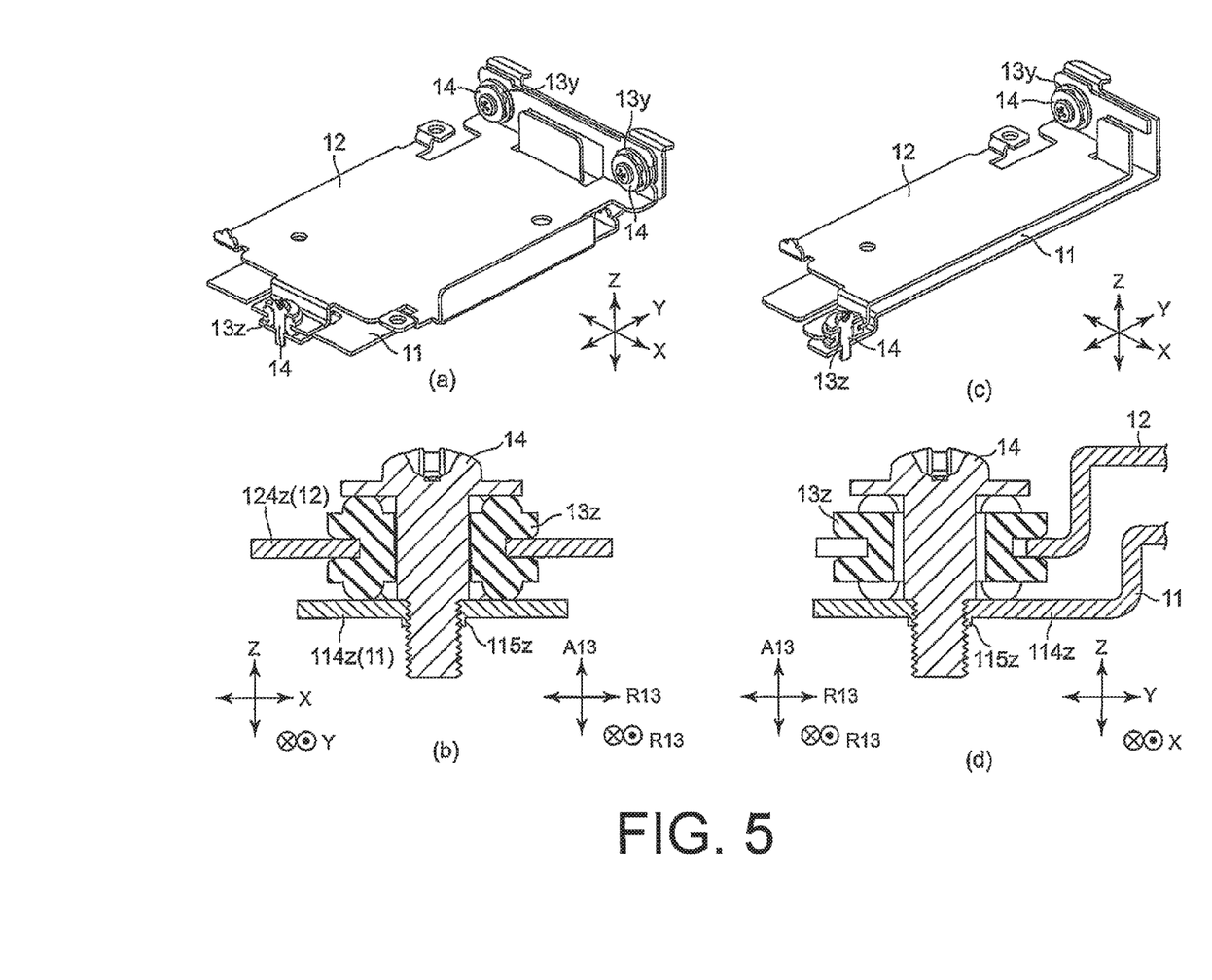
Figure 6:
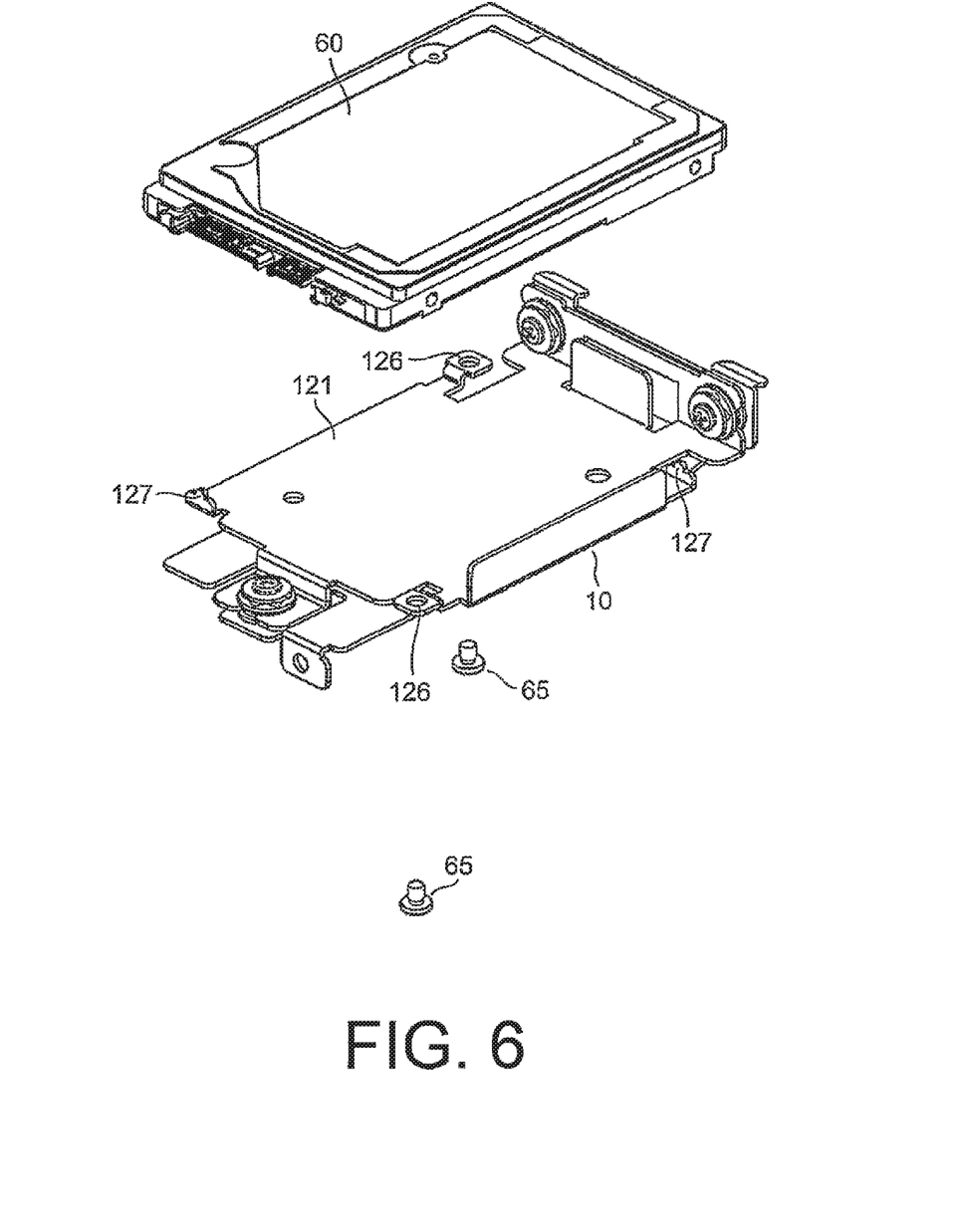
FIG. 6 is a perspective view for illustrating the HDD holding device of FIG. 1, and an HDD to be held by the HDD holding device.

That is, when the display unit 620 is in the upright state as illustrated in FIG. 11(a), the HDD unit 70 is built in the display unit 620 so that the mounting axis direction A13 (see FIG. 3(b) and the like) of each of the two buffer members 13y being the first buffer members is set along the height direction H of the main body 610, and that the mounting axis direction A13 (see FIG. 5(b) and the like) of the buffer member 13z being the second buffer member is set along the depth direction D of the main body 610.

As illustrated in FIG. 10(a) and FIG. 10(b), the HDD 60 of the HDD unit 70 built in the display unit 620 is electrically connected to the control circuit board 640 through a cable 650.

As illustrated in FIG. 2(a), the base portion 11 of the HDD holding device 10 includes the two insertion guide portions 113 and the one through-hole portion 112.

Figure 7:
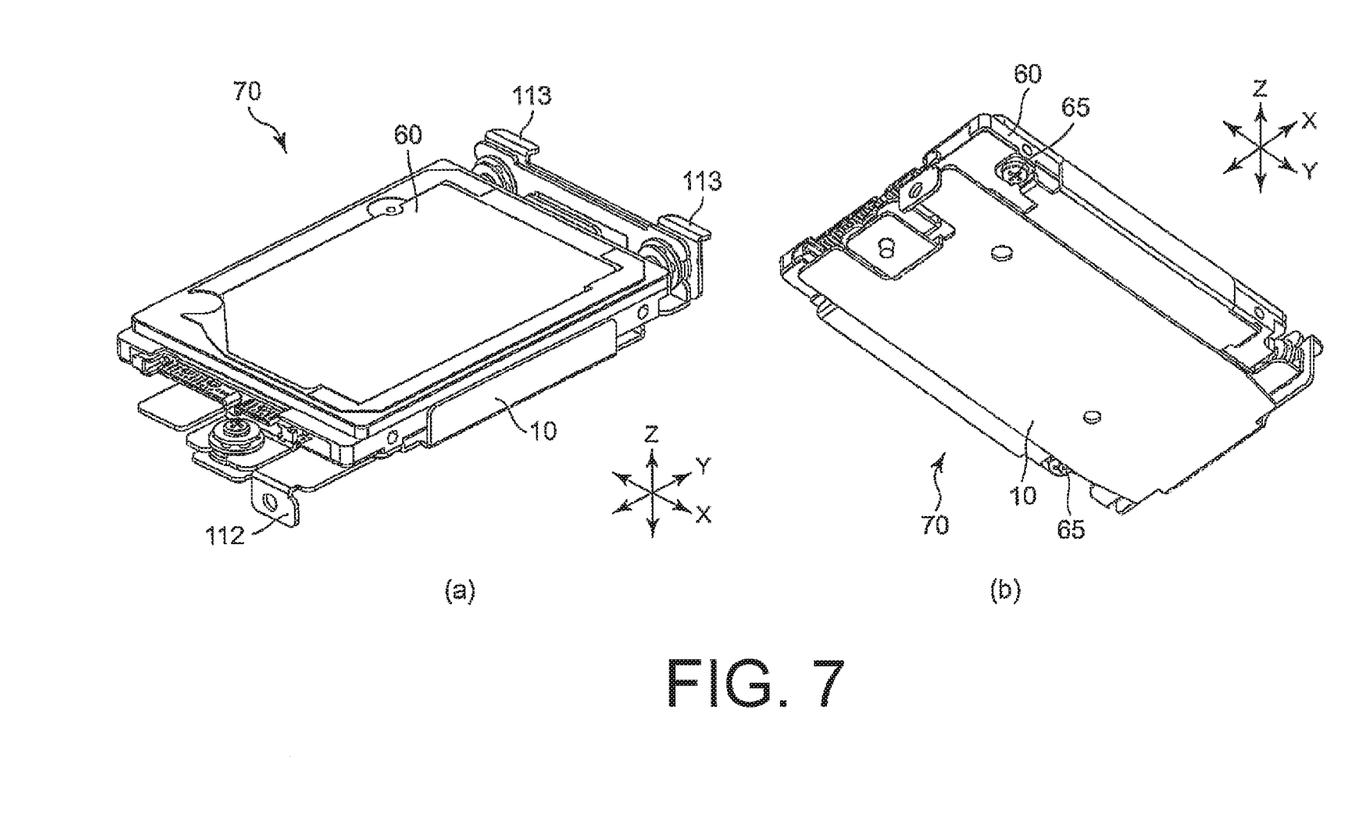
Figure 8:
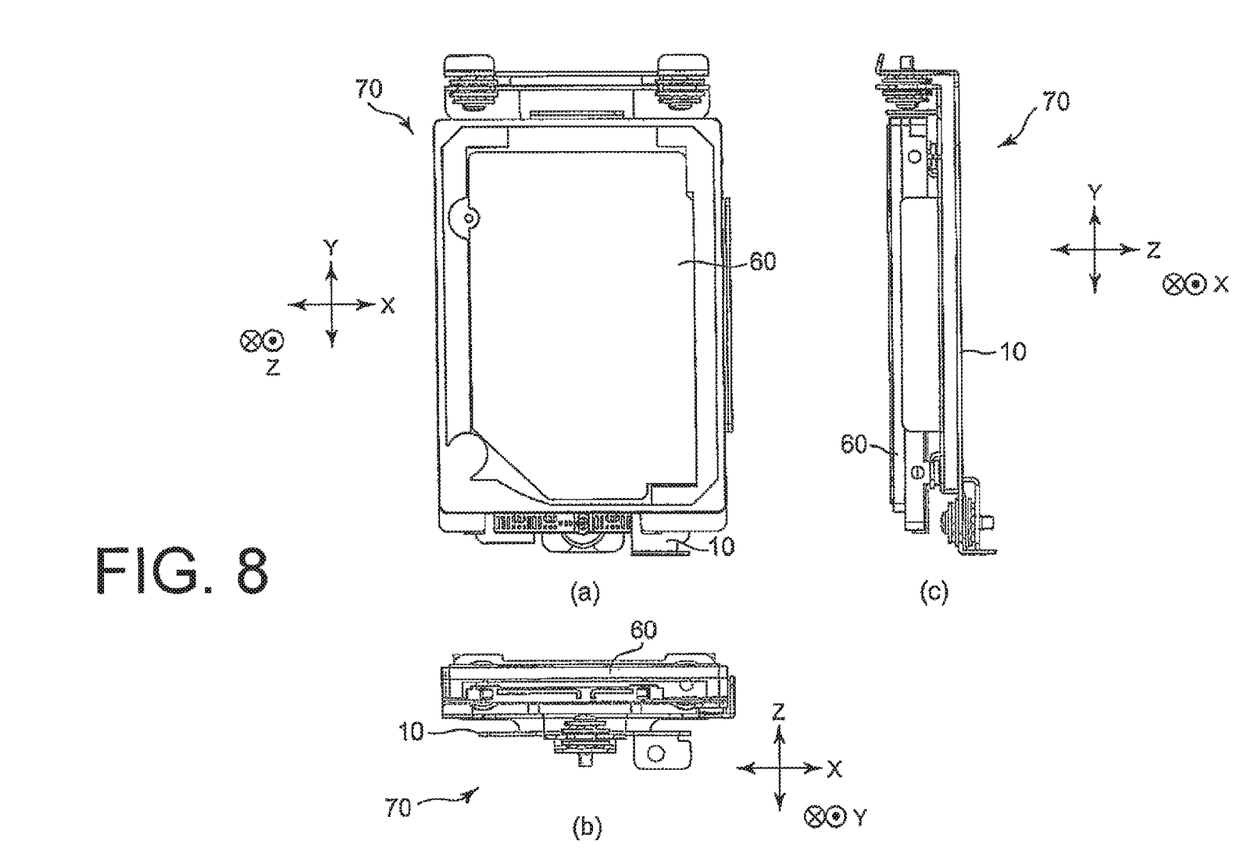
Figure 9:
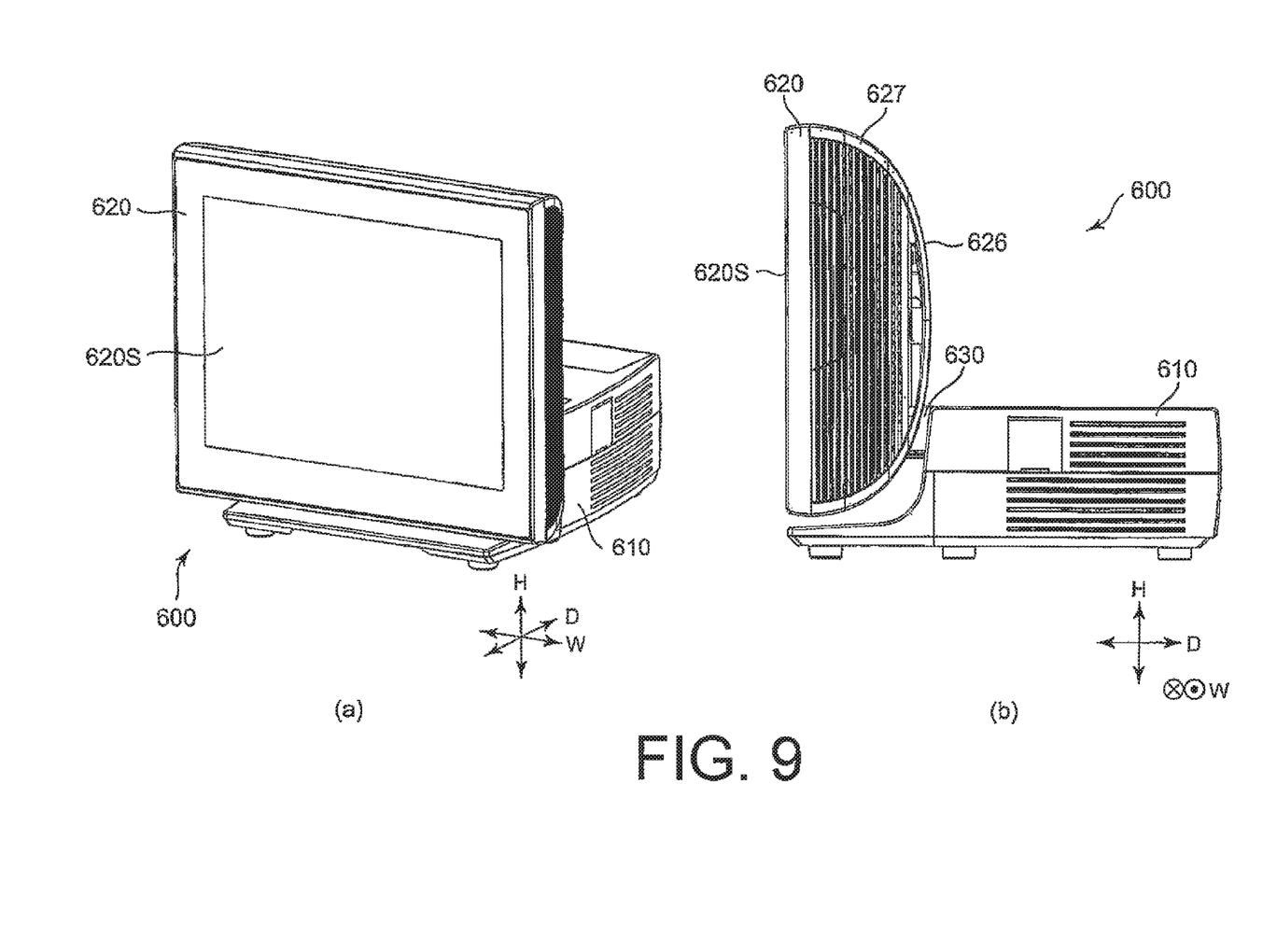

As illustrated in FIG. 10(a), from an opening portion of the display unit 620 from which the top cover 627 is removed, the HDD unit 70 is inserted into the HDD housing portion (not shown) formed in a frame in the display unit 620, and a screw 660 (FIG. 10(a)) is threadingly engaged through the through-hole portion 112 (FIG. 7(a)) into a screw hole portion formed in the frame (not shown). In this manner, the HDD unit 70 is fixed in the display unit 620. After that, a connector of the HDD 60 of the HDD unit 70 and the control circuit board 640 are electrically connected to each other through the cable 650. Then, the top cover 627 is mounted to the display unit 620. When maintenance or repair of the HDD 60 is performed, the HDD unit 70 is removed through procedures reverse to the above-mentioned procedures.

Incidentally, when the display unit 620 is tilted up to the tilt angle α (about 40 degrees) from the upright state illustrated in FIG. 11(a) toward the rear side of the main body 610 in the depth direction D as illustrated in FIG. 11(c), the HDD unit 70 built in the display unit 620 is also inclined at about 40 degrees at the maximum. While the display unit 620 is tilted, that is, while the tilt angle of the display unit 620 is varied, even when the display unit 620 is tilted to the maximum angle to reach a rearward tilting end, or even when the tilted display unit 620 is returned to the upright state to reach a forward tilting end, the two buffer members 13y being the first buffer members and the buffer member 13z being the second buffer member cooperate with each other, to thereby absorb shock satisfactorily. As a result, operation of the HDD 60 of the HDD unit 70 is not hindered.

INDUSTRIAL APPLICABILITY

This invention has been described above with reference to the embodiment, but various modifications understandable for a person skilled in the art may be made to the configurations and details of this invention.

For example, in this specification inclusive of Title of the Invention, the HDD is exemplified as an object to be held. However, as an object to be held by the holding device according to this invention, there can be exemplified general electronic devices including an information recording device such as an optical disk drive, a wired or wireless communication device, a control device, and an information input/output interface device, which can achieve simplification of work of mounting/removing the object to be held to/from a host apparatus by forming each device and the object to be held into a unit, and contain an electronic circuit or a precision machine structure, for which reception of shock is undesirable. That is, this invention proposes a device configured to hold an electronic device. Further, this invention is also applicable to, as the host apparatus for the holding device, electronic apparatus other than the information processing apparatus such as the POS terminal apparatus.

EXPLANATION OF REFERENCE SIGNS

10 HDD holding device
11 base portion
111 main surface
112 through-hole portion
113 insertion guide portion
114y, 114z seat portion
115y, 115z screw hole portion
12 HDD mounting portion
121 main surface
124y, 124z cutout portion
126 through-hole portion
127 positioning protrusion
13y, 13z buffer member
14 flanged screw
60 hard disk drive (HDD)
65 screw
70 HDD unit
600 POS terminal apparatus
610 main body (support base unit)
620 display unit
620S display screen
626 rear cover
627 top cover
630 tilt hinge unit
640 control circuit board
650 cable
660 screw

The invention claimed is:

1. An HDD holding device, configured to removably mount an HDD thereon and to be removably mounted to an information processing apparatus having an HDD housing portion, the HDD holding device comprising: a base portion; a plurality of buffer members; and an HDD mounting portion, which is configured to directly mount the HDD thereon, and is supported by the base portion through intermediation of the plurality of buffer members, wherein the plurality of buffer members intermediate only between the base portion and the HDD mounting portion, wherein the HDD holding device is mounted to the information processing apparatus by inserting the HDD holding device in the HDD housing portion and by fixing the base portion to the HDD housing portion, the plurality of buffer members comprising: a first buffer member having a first mounting axis direction and interposed between the base portion and the HDD mounting portion so that the first mounting axis direction is set along a first direction corresponding to a base depth direction of the base portion; and a second buffer member having a second mounting axis direction and interposed between the base portion and the HDD mounting portion so that the second mounting axis direction is set along a second direction corresponding to a base height direction of the base portion, wherein the first buffer member has a shock absorbing action exerted in the first mounting axis direction and has a shock absorbing action exerted in a direction orthogonal to the first mounting axis direction, wherein the second buffer member has a shock absorbing action exerted in the second mounting axis direction and a shock absorbing action exerted in a direction orthogonal to the second mounting axis direction, wherein a length of the base portion in a base width direction is not longer than a length of the HDD in a HDD width direction, wherein a length of the HDD mounting portion in a mount width direction is slightly longer than the length of the HDD in the HDD width direction, and wherein the first buffer member and the second buffer member are within a space corresponding to the length of the HDD in the HDD width direction.

2. The HDD holding device according to claim 1,
wherein, in a state of being capable of exerting the shock absorbing action, the first buffer member and the second buffer member are inserted into a cutout portion formed in the HDD mounting portion, and
wherein, in the state of being capable of exerting the shock absorbing action, the first buffer member and the second buffer member are inserted into the cutout portion of the HDD mounting portion and are fastened to the base portion with a screw.

3. The HDD holding device according to claim 1, wherein the number of at least one of the first buffer member and the second buffer member is a plural number.

4. An HDD unit, comprising:
the HDD holding device according to claim 1, wherein the HDD is held by the HDD holding device.

5. An information processing apparatus, comprising:
the HDD unit according to claim 4; and
an information processing unit configured to process information.

6. The information processing apparatus according to claim 5, the information processing apparatus further comprising:
a support base unit; and
a display unit mounted to the support base unit,
wherein the display unit is tiltable along a support depth direction of the support base unit from an upright state in which a display screen of the display unit is arranged along a support height direction of the support base unit, and
wherein, when the display unit is in the upright state, the HDD unit is built in the display unit so that the first mounting axis direction of the first buffer member is set along the support height direction of the support base unit, and that the second mounting axis direction of the second buffer member is set along the support depth direction of the support base unit.

7. The HDD holding device according to claim 1,
wherein the HDD mounting portion is provided with hole portions for fastening the HDD to the HDD mounting portion with screws,
wherein the HDD mounting portion is further provided with side portions corresponding to outsides of the base portion in the base width direction; the side portions are not overlapped with sides of the base portion in the base width direction, wherein a mounting side of the HDD mounting portion to which the HDD is to be mounted is opened upwardly, wherein the hole portions are formed on the side portions of the HDD mounting portion, and wherein the HDD is mounted to the HDD mounting portion with the screws which are inserted into the hole portions from a side opposed to the mounting side of the HDD mounting portion which is opposed to the base portion.

8. The HDD holding device according to claim 7, wherein, in a state of being capable of exerting the shock absorbing action, each of the first buffer member and the second buffer member is inserted into a cutout portion formed in the HDD mounting portion, and wherein, in the state of being capable of exerting the shock absorbing action, each of the first buffer member and the second buffer member is inserted into the cutout portion of the HDD mounting portion and is fastened to the base portion with a screw.

9. The HDD holding device according to claim 2, wherein the number of at least one of the first buffer member and the second buffer member is a plural number.

10. The HDD holding device according to claim 7, wherein the number of at least one of the first buffer member and the second buffer member is a plural number.

11. An HDD unit, comprising:
the HDD holding device according to claim 2, wherein the HDD is held by the HDD holding device.

12. An HDD unit, comprising:
the HDD holding device according to claim 3, wherein the HDD held by the HDD holding device.

13. An HDD unit, comprising:
the HDD holding device according to claim 7, wherein the HDD held by the HDD holding device.

14. An information processing apparatus, comprising:
the HDD unit according to claim 11; and
an information processing unit configured to process information.

15. An information processing apparatus, comprising:
the HDD unit according to claim 12; and
an information processing unit configured to process information.

16. An information processing apparatus, comprising:
the HDD unit according to claim 13; and
an information processing unit configured to process information.

17. The information processing apparatus according to claim 14, the information processing apparatus further comprising:
a support base unit; and
a display unit mounted to the support base unit,
wherein the display unit is tiltable along a support depth direction of the support base unit from an upright state in which a display screen of the display unit is arranged along a support height direction of the support base unit, and
wherein, when the display unit is in the upright state, the HDD unit is built in the display unit so that the first mounting axis direction of the first buffer member is set along the support height direction of the support base unit, and that the second mounting axis direction of the second buffer member is set along the support depth direction of the support base unit.

18. The information processing apparatus according to claim 15, further comprising:
a support base unit; and
a display unit mounted to the support base unit,
wherein the display unit is tiltable along a support depth direction of the support base unit from an upright state in which a display screen of the display unit is arranged along a support height direction of the support base unit, and
wherein, when the display unit is in the upright state, the HDD unit is built in the display unit so that the first mounting axis direction of the first buffer member is set along the support height direction of the support base unit, and that the second mounting axis direction of the second buffer member is set along the support depth direction of the support base unit.

19. The information processing apparatus according to claim 16, further comprising:
a support base unit; and
a display unit mounted to the support base unit,
wherein the display unit is tiltable along a support depth direction of the support base unit from an upright state in which a display screen of the display unit is arranged along a support height direction of the support base unit, and
wherein, when the display unit is in the upright state, the HDD unit is built in the display unit so that the first mounting axis direction of the first buffer member is set along the support height direction of the support base unit, and that the second mounting axis direction of the second buffer member is set along the support depth direction of the support base unit.

* * * * *

UNITED STATES PATENT AND TRADEMARK OFFICE
CERTIFICATE OF CORRECTION

PATENT NO. : 10,157,641 B2
APPLICATION NO. : 15/565988
DATED : December 18, 2018
INVENTOR(S) : Shinichirou Yonemaru Page 1 of 1

It is certified that error appears in the above-identified patent and that said Letters Patent is hereby corrected as shown below:

In the Specification

Column 4, Modes for Embodying the Invention, Line 52; Delete "tillable" and insert --tiltable-- therefor Column 5, Modes for Embodying the Invention, Line 14; Delete "114v," and insert --114y,-- therefor

Column 5, Modes for Embodying the Invention, Line 15; Delete "11.5y," and insert --115y,-- therefor Column 5, Modes for Embodying the Invention, Line 16; Delete "115z," and insert --115z.-- therefor Column 6, Modes for Embodying the Invention, Line 39; Delete "in" and insert --In-- therefor Column 7, Modes for Embodying the Invention, Line 65; Delete "a." and insert --a-- therefor Signed and Sealed this
Ninth Day of April, 2019

Andrei Iancu
*Director of the United States Patent and Trademark Office*